(12) United States Patent
Tylik et al.

(10) Patent No.: US 11,226,758 B2
(45) Date of Patent: Jan. 18, 2022

(54) VOLUME MIGRATION USING CROSS-APPLIANCE ASYMMETRIC NAMESPACE ACCESS GROUP

(71) Applicant: EMC IP Holding Company LLC, Hopkinton, MA (US)

(72) Inventors: Dmitry Nikolayevich Tylik, Westborough, MA (US); Mukesh Gupta, Shrewsbury, MA (US); Sathya Krishna Murthy, Morrisville, NC (US); Marina Shem Tov, Hod Hasharon (IL); Chen Reichbach, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 16/817,726

(22) Filed: Mar. 13, 2020

(65) Prior Publication Data

US 2021/0286540 A1 Sep. 16, 2021

(51) Int. Cl.
*G06F 3/06* (2006.01)
*G06F 11/14* (2006.01)
*G06F 11/20* (2006.01)

(52) U.S. Cl.
CPC ............ *G06F 3/0647* (2013.01); *G06F 3/061* (2013.01); *G06F 3/067* (2013.01); *G06F 3/0665* (2013.01); *G06F 11/1435* (2013.01); *G06F 11/2074* (2013.01)

(58) Field of Classification Search
CPC ...... G06F 3/0647; G06F 3/061; G06F 3/0665; G06F 3/067; G06F 11/1435; G06F 11/2074

USPC .......................................................... 711/161
See application file for complete search history.

(56) References Cited

U.S. PATENT DOCUMENTS

| | | | |
|---|---|---|---|
| 7,383,383 B1 | 6/2008 | Bandopadhyay et al. | |
| 8,775,773 B2 | 7/2014 | Acharya et al. | |
| 9,661,078 B1 | 5/2017 | Long | |
| 9,971,709 B1 | 5/2018 | Long et al. | |
| 2014/0372462 A1* | 12/2014 | Leahy Wise | G06F 16/284 |
| | | | 707/756 |
| 2015/0324126 A1* | 11/2015 | Nakajima | G06F 3/0647 |
| | | | 711/114 |
| 2017/0154093 A1* | 6/2017 | Shetty | G06F 3/0617 |
| 2019/0332609 A1* | 10/2019 | Shetty | G06F 3/065 |

(Continued)

*Primary Examiner* — Than Nguyen
(74) *Attorney, Agent, or Firm* — BainwoodHuang

(57) ABSTRACT

Migrating a source volume from a source appliance to a destination appliance, wherein the source volume is assigned to an asymmetric namespace access (ANA) group and initially exposed to a host computer as accessible at the source appliance, includes creating a destination volume on the destination appliance and expanding the ANA group to include the destination volume, with the ANA group initially exposing the destination volume as inaccessible to the host computer at the destination appliance. Subsequently, the destination volume is synchronized to the source volume and then a cutover is performed that includes (i) copying volume metadata including host reservations from the source volume to the destination volume, and (ii) changing the ANA group to expose the source volume as inaccessible at the source appliance and the destination volume as accessible at the destination appliance.

17 Claims, 8 Drawing Sheets

(56) References Cited

U.S. PATENT DOCUMENTS

2020/0042537 A1\* 2/2020 Kaushik .............. G06F 11/1464
2021/0034270 A1\* 2/2021 Gupta ................... G06F 3/0679

\* cited by examiner

VOLUME MIGRATION USING CROSS-APPLIANCE ASYMMETRIC NAMESPACE ACCESS GROUP

BACKGROUND

The present invention is related to the field of data storage, and in particular to techniques for migrating data volumes among data storage appliances of a data storage system.

SUMMARY

A method is disclosed of migrating a source volume from a source appliance to a destination appliance, wherein the source volume is assigned to an asymmetric namespace access (ANA) group and initially exposed to a host computer as accessible at the source appliance. The method includes creating a destination volume on the destination appliance and expanding the ANA group to include the destination volume, with the ANA group initially exposing the destination volume as inaccessible to the host computer at the destination appliance.

Subsequently, the destination volume is synchronized to the source volume and then a cutover is performed that includes (i) copying volume metadata including host reservations from the source volume to the destination volume, and (ii) changing the ANA group to expose the source volume as inaccessible at the source appliance and the destination volume as accessible at the destination appliance.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview—Problem Being Addressed

Figure 1:
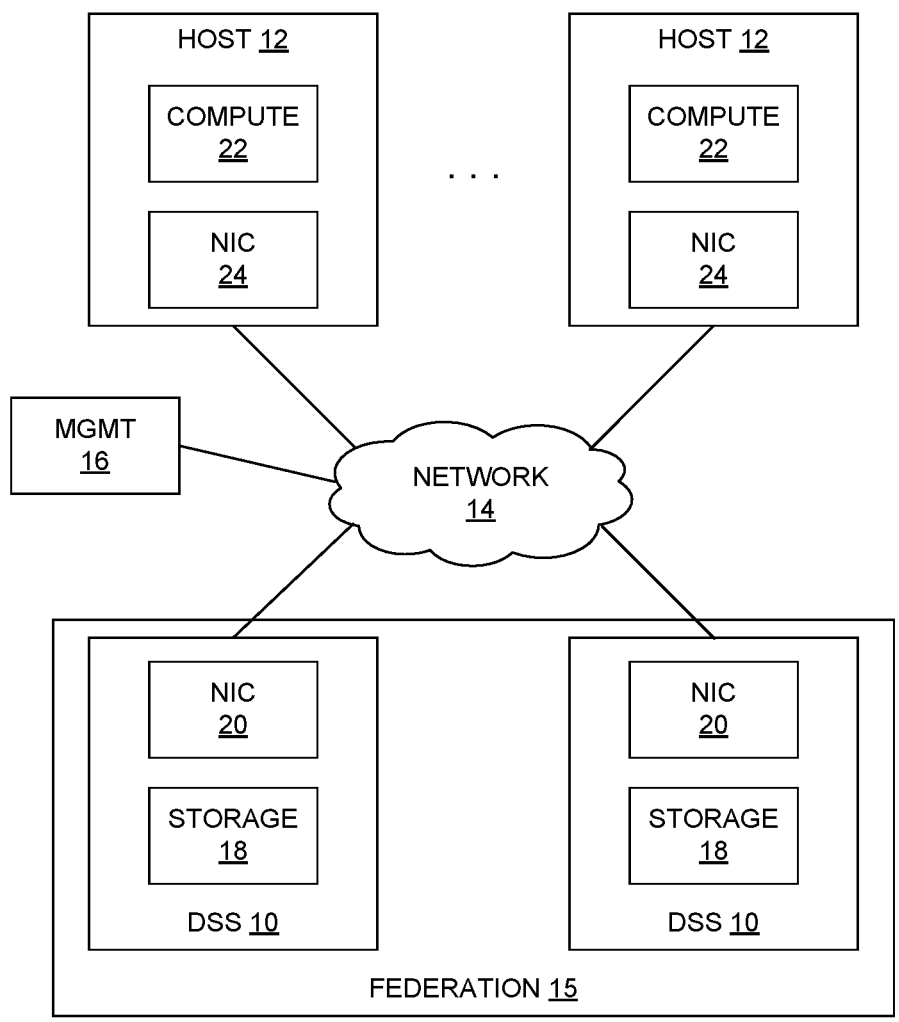
FIG. 1 is a block diagram of a computer system including a federation of data storage systems.

A data storage system can be realized as a scale out federation of highly-available two-node appliances that may support multiple storage protocols such as iSCSI, Fibre Channel, and the newer NVMe over Fabrics (NVMe-oF) for host access/attachment. Existing systems may support volume migration in a context of SCSI-based host attachment, which provides for IO cutover using asymmetric logical unit access (ALUA) path state switch. With NVMe-oF host attachment, ALUA is not available and thus ALUA path switching cannot be used. Additionally, NVMe reservations are implemented differently from SCSI reservations. In NVMe, reservations are associated with controllers through which hosts establish the reservations. So once a volume is exposed on the destination appliance, a Reservation Report is invoked through controllers on the source appliance and should include controllers on the destination appliance as well. Thus, another challenge in the NVMe-oF environment is to maintain a correct controller list for reservations throughout volume migration.

Overview—Solution

Each volume provisioned in a disclosed data storage federation is placed on a specific data storage system or "appliance" within the federation, as there is no concept of volume blocks being distributed across appliances. Each volume can be attached to NVMe-oF or SCSI hosts, but not both types at the same time. Once multiple volumes are created across a federation, it may become necessary to migrate volumes between appliances, for example to rebalance storage space or improve front-end IO bandwidth utilization. Such a migration can be initiated by a storage administrator or by a built-in resource balancer component, for example. Data movement is performed by a data migration engine, which may employ the technique of "snapshot shipment" for example, so data is copied outside of the IO path for the majority of the migration duration.

Key aspects of the disclosed system include the use of asymmetric namespace access (ANA) groups in a particular way, namely a specific way of expanding them across the appliances of a federation to support the migration. By using ANA groups which are native to NVMe environments, the technique directly provides for migration functionality in the context of NVMe-oF host attachment.

The disclosed technique assumes an operating environment having the following features of NVMe-oF systems:

Namespace: Quantity of non-volatile memory that may be formatted into logical blocks. When formatted, a namespace of size n is a collection of logical blocks with logical block addresses from 0 to (n−1). In this description, the acronym "NS" is used as shorthand for Namespace.

NVMe Subsystems: Entities each including one or more controllers, zero or more namespaces, one or more ports, a non-volatile memory storage medium, and an interface between the controller(s) and non-volatile memory storage medium.

Controllers: Enable Hosts to attach to Namespaces for submitting IO commands.

Asymmetric Namespace Access (ANA) Group: Contains namespaces attached by a host to a Controller for which each access path to the controller is always in the same ANA path state for all namespaces in the ANA Group (Optimized, Non-Optimized, Inaccessible, Persistent Loss).

Embodiments

FIG. 1 shows a data processing system having a plurality of data storage systems (DSSs) 10 and host computers (HOSTS) 12 functionally coupled by one or more data communications networks 14. The network 14 employs a host-to-storage attachment technology known as NVMe over Fabrics (NVMe-oF), as mentioned above (i.e., a technology employing namespaces and ANA groups). "NVMe" stands for non-volatile memory express. The DSSs 10 constitute a "federation" 15, which in the present context signifies certain close co-operation specifically for volume migration as described herein. A data storage system 10 as alternatively referred to as an "appliance" in this description. The data processing system may also include a management station 16 as shown.

The DSSs 10 include respective storage subsystems 18 and network interface subsystems shown as network interface controllers (NICs) 20, and the hosts 12 include respective compute subsystems 22 and network interface controllers/subsystems (NICs) 24. As generally known in the art, each subsystem 18-24 includes corresponding hardware and software resources specially tailored for the corresponding functionality. The compute subsystem 22 includes processors, memory and interface logic enabling it to execute system-level software such as operating systems, hypervisors, etc. along with user-level applications such as database applications, transaction applications, other server applications, etc. The network subsystems 20 and 24 include specialized interface circuitry, processing circuitry and software/firmware enabling them to provide data communications services including local-area networking, federation, wide-area networking, storage-area networking, etc. The storage subsystem 18, which may also be referred to as a data storage subsystem 18 herein, includes specialized interface circuitry, processing circuitry, software/firmware, and physical storage devices (such as disks, Flash memory modules, etc.) enabling it to provide a variety of secondary storage related services.

Figure 2:
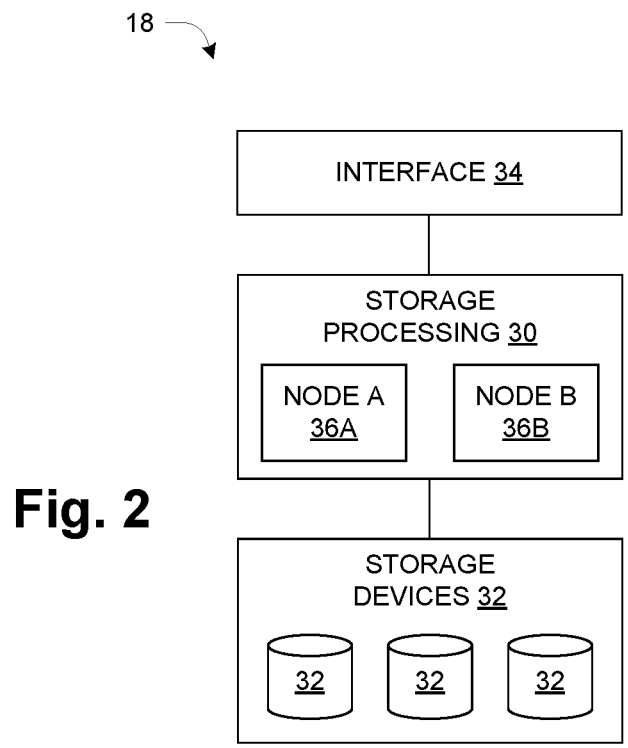
FIG. 2 is a block diagram of a data storage system from a hardware perspective.

FIG. 2 is a block diagram of a storage subsystem 18. It includes a storage processing unit 30, a set of physical storage devices 32, and interface circuitry 34 for interfacing to the associated network subsystem 20 (FIG. 1). The storage processing unit 30 has two separate processing nodes, shown as an A node 36A and a B node 36B. Each of these is a complete storage processor with software and firmware providing all storage-related functionality, for example the handling of incoming storage read and write requests, configuration and maintenance operations, and in particular data and functionality related to volume migration, as briefly mentioned above and described more fully below. In this respect the operating software interacts with corresponding functionality of the hosts 12 and the management station 16, as well as with peer storage systems 18 of other appliances DSSs 10.

The description below is directed to operation at a logical layer generally above the physical layer at which data is transferred to and from the physical storage devices 32. As generally known in the art, data storage systems typically create logical abstractions of underlying storage and present these to operating software (e.g., applications, operating systems, hypervisors) to provide certain system benefits. For example, the specialized chores of managing the physical storage devices 32 can be contained in the storage subsystem 18, freeing the hosts 12 and their various operating software (especially applications) from any need to address such details. Block-structured abstractions such as logical units (LUNs) and volumes are generally known. A file system and its collection of user-visible files and directories is also such an abstraction. Such higher-level logical operations may be provided by the storage processing unit 30. The present description is directed to certain specific types of higher-level logical operations, specifically to the moving or migrating of logical volumes from one DSS 10 to another, as described more below.

Figure 3:
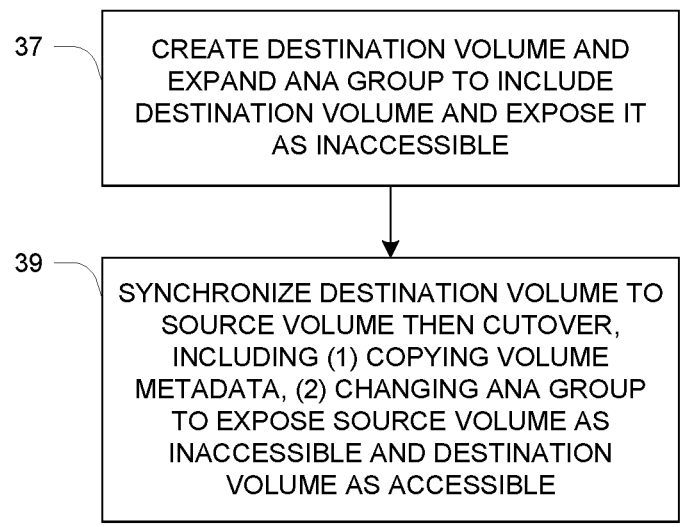
FIG. 3 is a high-level flow diagram of volume migration operation.

FIG. 3 is a high-level flow diagram of volume migration as described herein, specifically a method of migrating a source volume from a source appliance (e.g., one DSS 10 of federation 15) to a destination appliance (e.g., the other DSS 10 of federation 15), wherein the source volume is assigned to an asymmetric namespace access (ANA) group and initially exposed to a host computer as accessible at the source appliance.

At 37, the method includes creating a destination volume on the destination appliance and expanding the ANA group to include the destination volume. The ANA group initially exposes the destination volume as inaccessible to the host computer at the destination appliance.

At 39, the method includes subsequently synchronizing the destination volume to the source volume and then performing a cutover including (i) copying volume metadata including host reservations from the source volume to the destination volume, and (ii) changing the ANA group to expose the source volume as inaccessible at the source appliance and the destination volume as accessible at the destination appliance. It should be noted that this description also uses a somewhat narrower meaning for "cutover" in connection with the use of intermediate Change states, as explained further below.

The above general technique is utilized in a more detailed and specific migration operation described below with reference to FIGS. 4-9.

Figure 4:
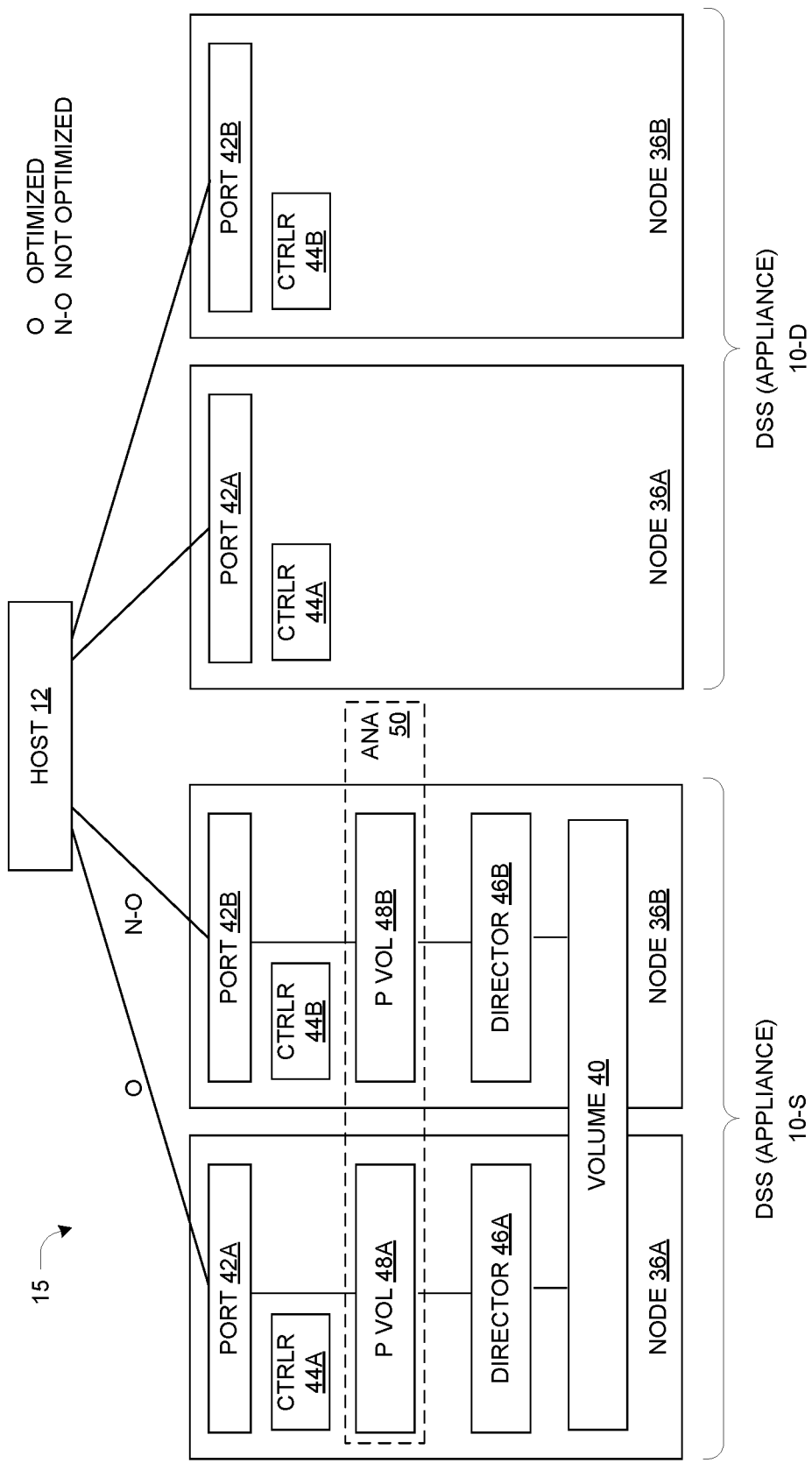
FIGS. 4-9 are functional schematic diagrams of the federation of data storage systems during respective stages of the volume migration operation.

FIG. 4 illustrates pertinent logical-layer organization of the federation 15, specifically at a time prior to commencement of the migration operation. As shown, a "source" DSS (appliance) 10-S includes a volume (VOL) 40, which is shown as spanning the two nodes 36A, 36B to reflect its appliance-wide definition and availability. Each node 36 also includes a respective NVMe port 42, NVMe controller (CTRLR) 44, and director 46, as well as a respective "platform volume" (P VOL) 48 which is a node-specific representation of the volume 40. Also illustrated is an Asymmetric Namespace Access (ANA) group 50, also defined for the whole appliance 10-S. The "source" or "S" designation of appliance 10-S indicates its role in migration, i.e., as the source of a volume 40 being migrated to the "destination" DSS (appliance) 10-D. FIG. 4 shows only the ports 42 and controllers 44 of the destination appliance 10-D at this pre-migration stage of operation. Note that the volume 40 is also referred to as the "source volume" herein, reflecting its role in the migration.

The ANA group 50 provides a mechanism for a host 12 to locate and access underlying storage of the volume 40, as generally known in the art. It serves as an access point for data traffic for the volume 40. In one embodiment, the storage subsystem 18 supports asymmetric multipathing used by a multipathing function (driver) of the host 12, and the ANA group 50 is visible as part of the logical paths extending to storage resources 32 (FIG. 2). Within the federation 15, the ANA Group 50 maintains and access path state and exposes it to the host 12 as described below.

There are two requirements for making a migration and cutover non-disruptive for ongoing IO of the host 12:
1. The same NVMe namespace identity (NSID and NGUID) is exposed from the source appliance 10-S and the destination appliance 10-D
2. The host discovers ANA Group states (paths) on both the source 10-S and the destination 10-D prior to the cutover, so the federation 15 can employ ANA Group state switching to cause automatic routing of host IO to the destination 10-D once volume data migration has completed Volume Migration Operation The migration operation is described as a sequence of steps 1-8, with reference to FIGS. 4-9 as needed. As a point of clarity, the term "volume" is used herein in two different ways. First, the subject of a migration is a single logical volume having a single unique identity, also referred to herein as a "primary" volume. The term is also used to describe more specific logical entities used in the migration operation, all of which represent the same primary volume from the perspective of a host 12. The terms "source" and "destination" are used to describe physical location and logical function of these logical entities, again with the understanding that they all refer to the same logical unit of storage having a system wide unique identity.

Step 1: Primary Volume Provisioned (FIG. 4)

A primary volume with an NVMe namespace ID (NSID) NSID1 and namespace global unique (NGUID) NGUID1 is provisioned on source appliance 10-S (e.g., per resource balancer recommendation). This creates the platform volumes 48A, 48B as well as the volume 40 to hold the data. It is assumed by this time the host 12 has connected to NVMe-oF ports 42 across all nodes 36 in the federation and therefore each node 36 has an NVMe controller 44.

Step 2: Volume is Mapped to Host (FIG. 4)

The volume 40 on the source appliance 10-S is mapped to the host 12 and an ANA Group 50 is created, which exposes two access path states to the host 12: an Optimized path state through Controller 44A and a Non-optimized path state through Controller 44B. The host 12 can discover the ANA Group 50 by requesting Asymmetric Namespace Access Log Page 0Ch. Note that both the Optimized and Non-optimized path states reflect that the volume 40 is accessible via these paths, in contrast to an Inaccessible path state which is also utilized in the migration as described more below. The result of steps 1 and 2 is to make the volume 40 accessible to the host 12 for normal IO (storage read and write operations).

Figure 5:
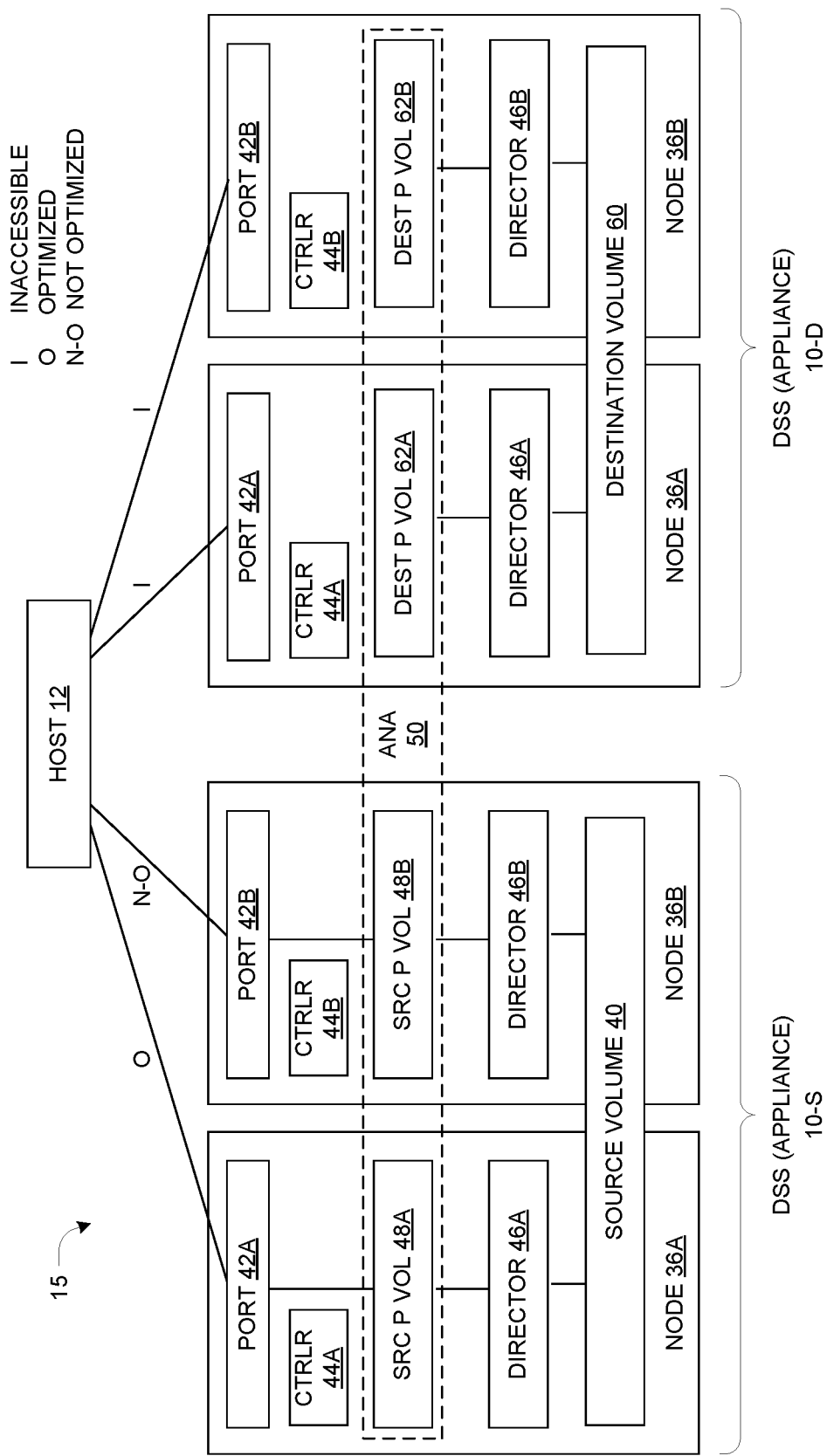

Step 3: Create Destination Volume (FIG. 5)

The destination volume 60 and platform volumes 62A, 62B are created on the destination appliance 10-D, which will serve as the destination objects for an internal replication session. These are given the same NVMe identifiers NSID1 and NGUID as the primary volume, and the ANA group 50 is expanded to encompass the destination volume. Note that the volume 40 on the source appliance 10-S is now shown as the source (SRC) volume 40, reflecting its role in the migration. ANA group state is initially set to Inaccessible through both controller 44A and controller 44B of destination appliance 10-D. To notify the host 12 of a namespace becoming available through a controller 44, an Asynchronous Event Request command may be utilized per controller 44 with "Asynchronous Event Information—Notice" set to "Namespace Attribute Changed". At this point the host 12 should rescan for new paths, which may be automatic by the host software or semi-automated with involvement of an application administrator. The Reservation Keys and Reservations established by the host 12 for the namespace NGUID1 through controllers 44A and 44B of source appliance 10-S are expanded to include controllers 44A and 44B of destination appliance 44-D. In case of the host disconnecting from destination appliance 10-D and then re-connecting, new controller IDs assigned by operating software should be propagated to Reservations on the source appliance 10-S.

Figure 6:
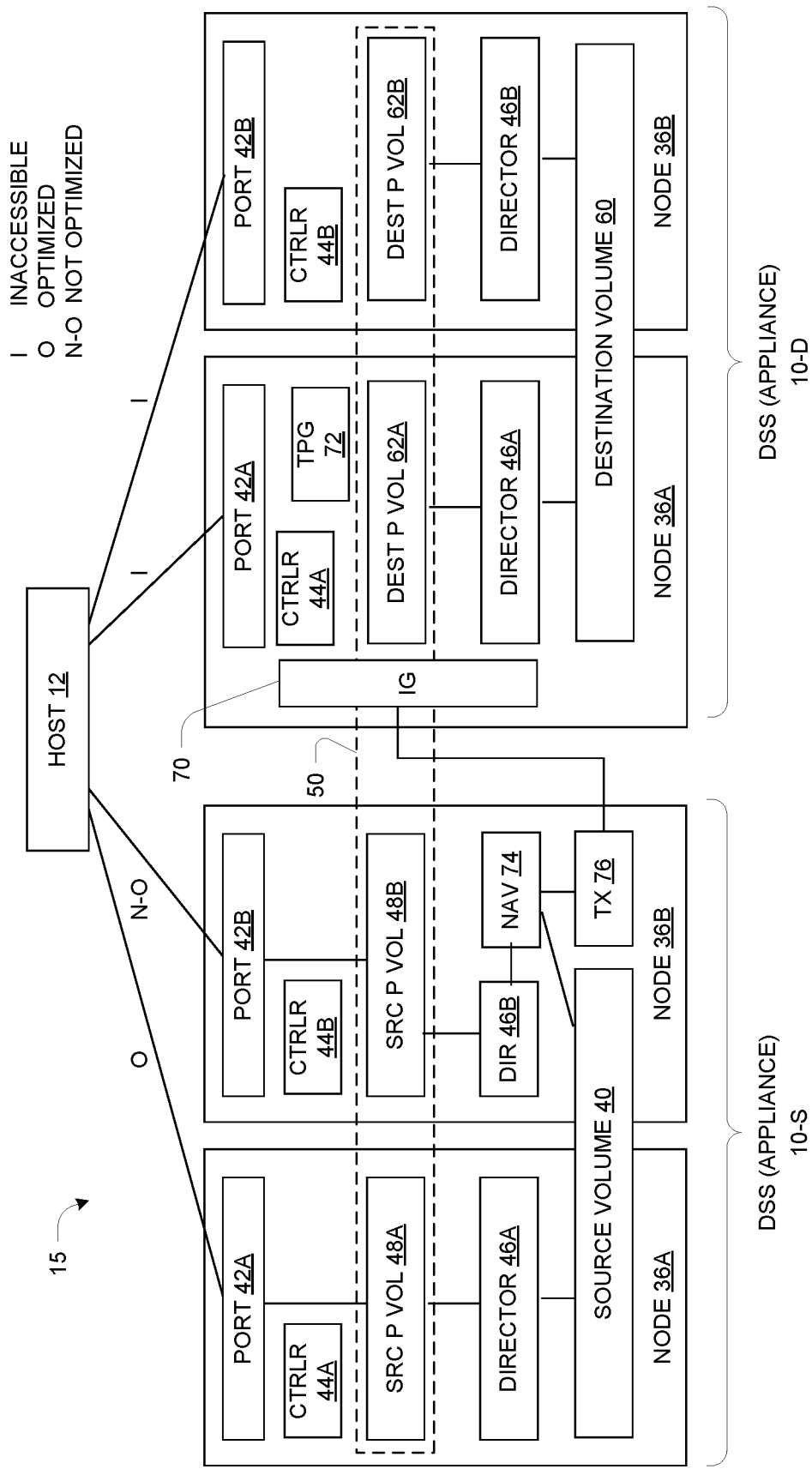

Step 4: Synchronize (FIG. 6)

A background copy is first performed using intra-federation iSCSI transport to copy the volume data to the destination appliance 10-D. To enable that, the destination volume 60 is mapped for access to an internal Initiator Group (IG) 70 that represents source appliance 10-S initiators on the destination appliance 10-D. Active-optimized ALUA paths for source appliance initiators are created through a target port group (TPG) 72, which is a SCSI mechanism for grouping target ports and reporting ALUA path states. As a result the same volume is mapped with NVMe-oF to the host 12 and iSCSI to the source appliance 10-S.

Asynchronous replication is initiated to replicate the content of the namespace object on the source appliance 10-S to the volume 60 on the destination appliance 10-D. Derived objects (e.g., snapshots) and their metadata are also copied. The details of these steps are not shown. Finally, mirroring is setup between the two volumes 40, 60 by inserting a navigator (NAV) 74 and a transit (TX) 76 on the source appliance 10-S as shown. At the end of this operation, all IO to the source volume 40 are mirrored to the destination volume 60, to contain identical data. However, the destination volume 60 remains Inaccessible as shown. It should be noted that FIG. 6 shows the components 70-76 on only a single node 36 for simplicity. In fact these components are deployed on both nodes 36 of the respective appliances 10.

Figure 7:
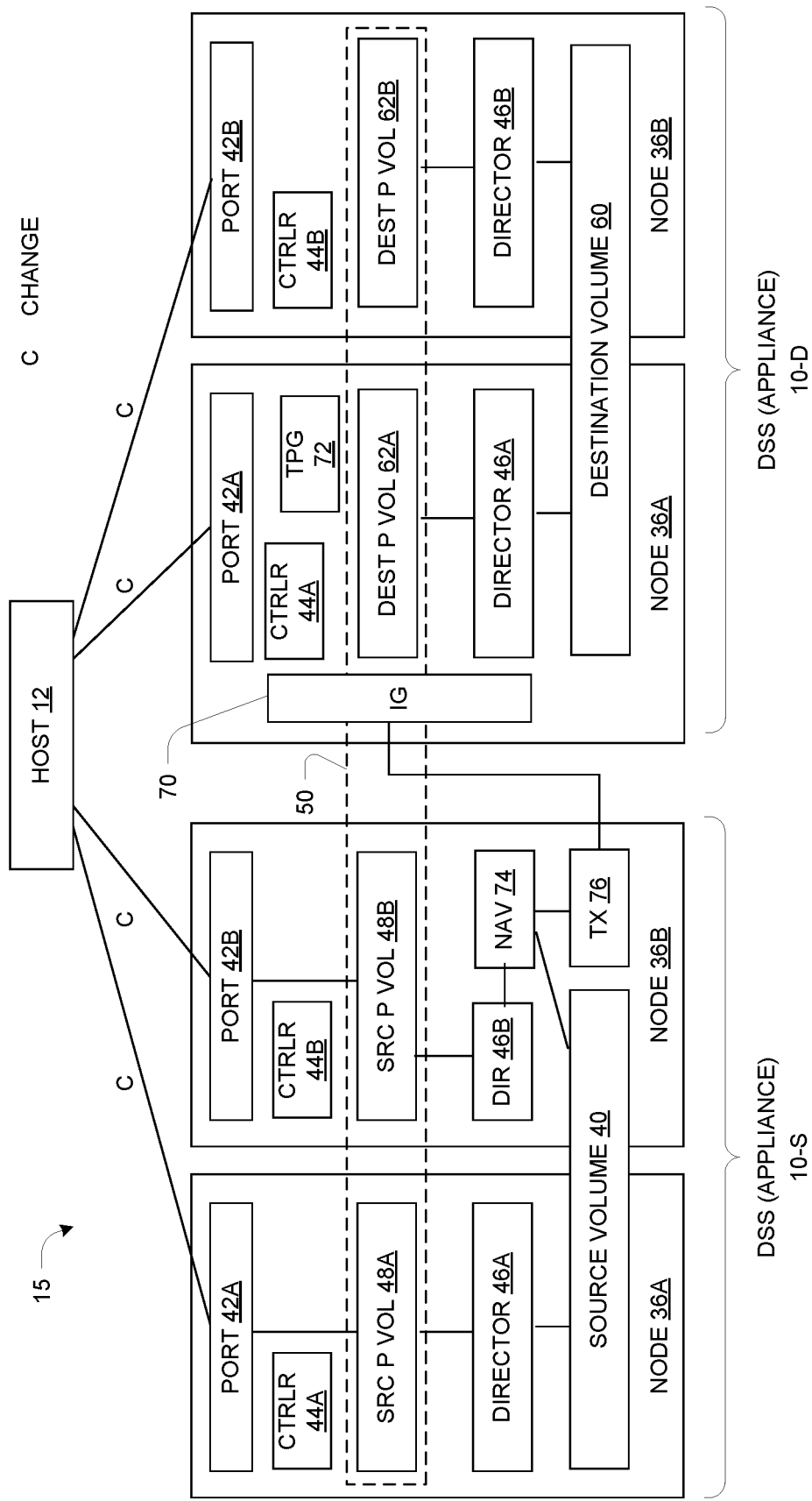

Step 5: Switch ANA Group to CHANGE State (FIG. 7)

All controllers 44 switch the respective paths to the ANA Group 50 to a Change state, which is understood by the host 12 as a short-term inaccessibility that requires the host 12 to manage IO accordingly (e.g., delay, use retries, selectively fail if necessary, etc.). Although it may not be required, it may beneficial to utilize Asynchronous Even Request commands when switching ANA group to the Change state. All outstanding IO on the source 10-S is flushed to storage 32 and mirrored to the destination 10-D. Any new IO is failed with ANA Transition.

In addition to the transition to Change state reporting for the ANA group, each appliance 10-S also establishes "fallback" states which are needed in case of a crash or other sudden failure at this critical stage. When the system recovers from the event, it has to confirm data consistency before commencing normal operation, and the state of FIG. 7 is indeterminant. Thus, at this point the assignment of fallback states is the states as existing before switching to Change, i.e., Optimized and Non-optimized on the source appliance 10-S, and Inaccessible on the destination appliance 10-D. ANA Group paths are switched to these fallback states in the event of failure recovery as mentioned, but they are also used during normal subsequent Cutover operation as now described.

Step 6: Cutover (FIG. 7)

It should be noted that before a cutover can be completed, it is necessary to confirm that the navigator on the Appliance 1 is still in "in sync" state. If the mirroring is broken, the cutover is failed and IO is resumed based on the fallback states as described above for Step 5.

The cutover involves the following operations executed in a single transaction:

1. Copy all of the protocol-specific volume metadata (reservations, destination attributes, etc.) from the source volume 10-S to the destination volume 10-D.
2. Switch the ANA Group fallback state at the source appliance 10S (controllers 44A, 44B) to Inaccessible. Note that this is only the fallback state, not the actual ANA state as visible to the host, which remains Change.
3. Switch the ANA Group fallback state at the destination appliance 10-D (controllers 44A, 44B) to Optimized and Non-optimized. Again, these fallback states are not yet exposed to the host 12.

The above description of "cutover" reflects the use of Change state signaling (Step 5). Upon completion of Step 6, the host 12 cannot yet access the destination volume 60, due to the persisting Change state of the ANA group paths at appliance 10-D. Nonetheless, going forward the volume will only be accessible at the destination appliance 10-D and not at the source appliance 10-S, in both the normal course (steps 7-8 below) and in the event of a failure, in which case the path states will be switched to the updated fallback states. Thus, completion of Step 6 really is the cutover point, with subsequent normal-course steps providing signaling to the host 12 and then cleaning up.

Figure 8:
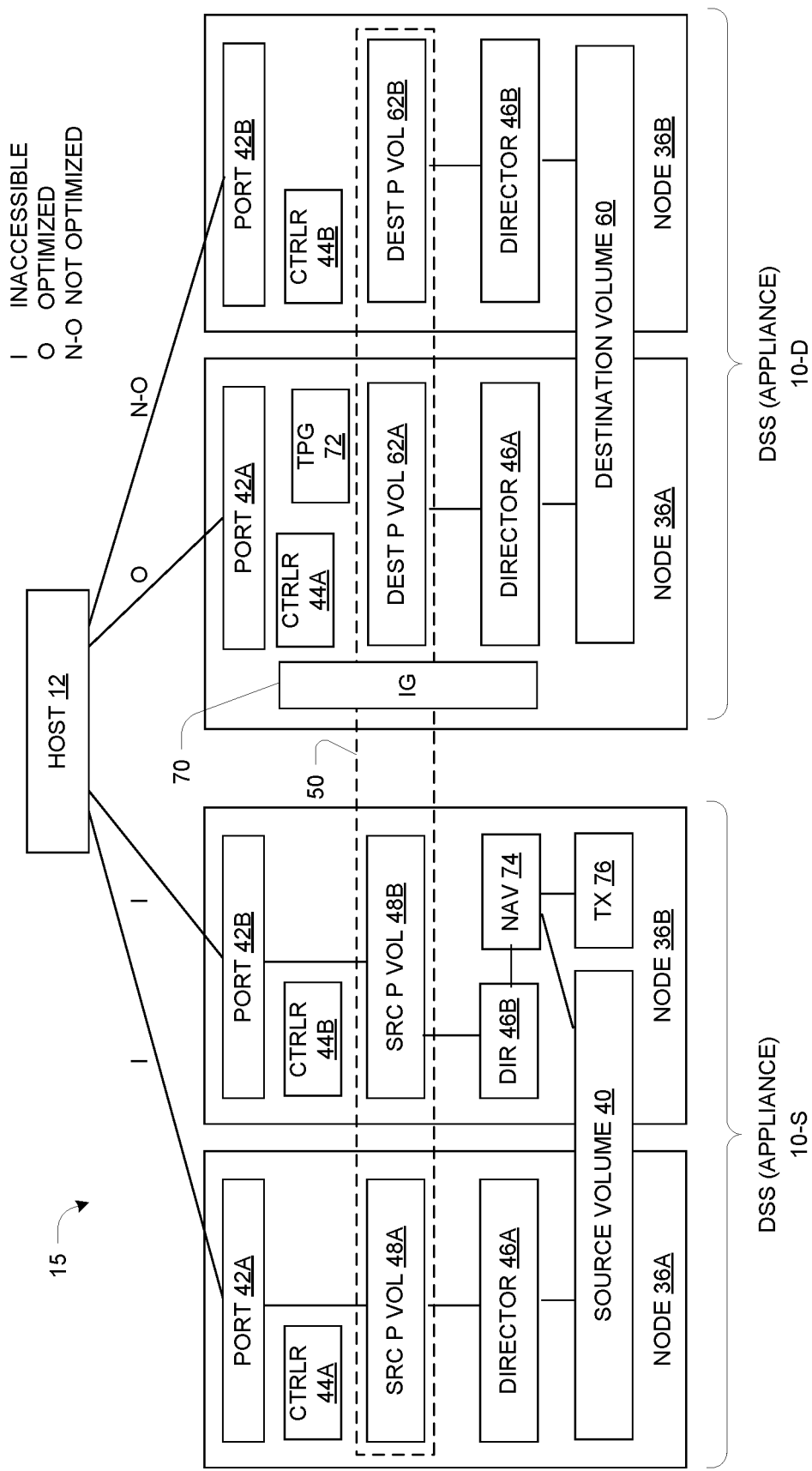

Step 7: Switch ANA Group Paths to "Fallback" States (FIG. 8)

At each appliance 10, switch the ANA Group paths to their respective fallback states. This results in exposing the ANA Group state for controllers 44A and 44B of appliance 10-D as Optimized and Non-optimized, and for Controllers 44A and 44B of source appliance 10-S as Inaccessible. An Asynchronous Event Request command is completed per controller 44 to notify the host 12 of the ANA Group path states change.

Figure 9:
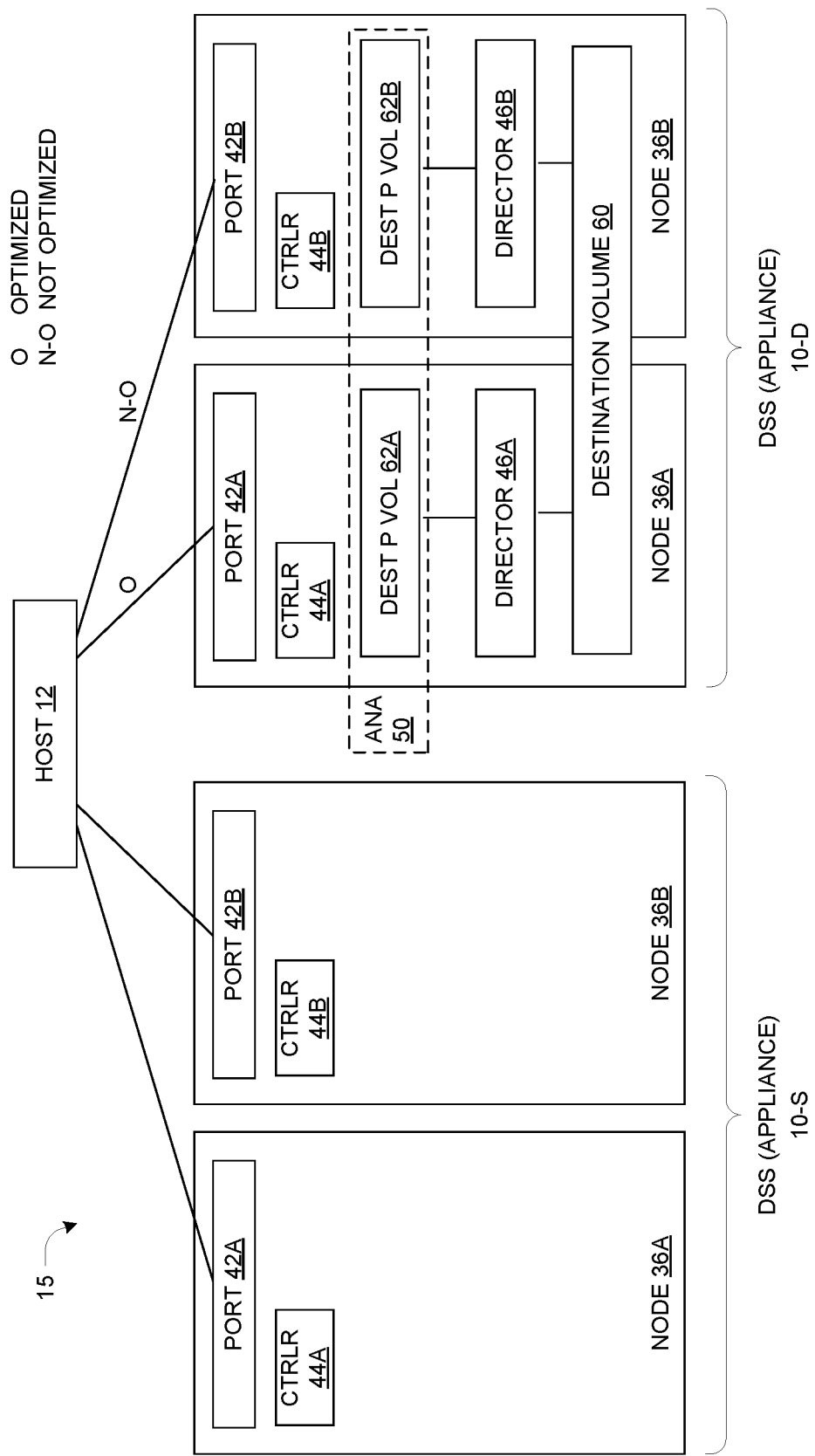

Step 8: Cleanup (FIG. 9)

Remove all data path and platform objects on the source appliance 10S, which necessarily shrinks the ANA group 50 to encompassing only the destination appliance 10-D as shown. Now the volume identified by NSID1 and NGUID1 is fully hosted (as destination volume 60) by the destination appliance 10-D. Cleanup includes completing an Asynchronous Event Request command per controllers 44A and 44B with Notice set to "Namespace Attribute Changed" to notify the host 12 that the namespace is no longer available through these two controllers.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a data storage federation having a source appliance and a destination appliance to non-disruptively migrate a primary volume as a source volume from the source appliance to the destination appliance, comprising:

provisioning the source volume and mapping the source volume to a host computer, the source volume being associated with a namespace being a quantity of non-volatile storage formatted into logical blocks, the mapping including assigning the source volume and the namespace to an asymmetric namespace access (ANA) group, the ANA group initially exposing the source volume and the namespace to the host computer as accessible at the source appliance;

based on the provisioning and mapping making the source volume accessible to the host computer, performing storage read and write operations of the host computer to the source volume at the source appliance; and subsequently migrating the source volume to the destination appliance by:

(1) creating a destination volume on the destination appliance and expanding the ANA group to include the destination volume, the destination volume being associated with the namespace, the ANA group initially exposing the destination volume and the namespace as inaccessible to the host computer at the destination appliance; and (2) subsequently synchronizing the destination volume to the source volume and then performing a cutover including (i) copying volume metadata including host reservations from the source volume to the destination volume, and (ii) changing the ANA group to expose the source volume and the namespace as inaccessible at the source appliance and the destination volume and the namespace as accessible at the destination appliance.

2. The method of claim 1, further including, prior to the cutover, changing the ANA group to expose a Change access state for both the source volume at the source appliance and the destination volume at the destination appliance, the Change state signifying a temporary inaccessibility to the host that effectively suspends host IO to the primary volume during the cutover.

3. The method of claim 2, further including, in connection with the use of the Change access state, the use of corresponding internal fallback states for handling failures during the migration, the fallback states being initially set to accessible at the source appliance and inaccessible at the destination appliance, and then during the cutover being set to inaccessible at the source appliance and accessible at the destination appliance, thus ensuring that future access to the primary volume is at the destination appliance and not the source appliance.

4. The method of claim 1, wherein changing the ANA group to expose the destination volume as accessible at the destination appliance includes use of an Optimized path state and a Non-optimized path state, the Optimized path state identifying a default access path for normal operation, the Non-optimized state identifying a secondary path usable for exceptional conditions.

5. The method of claim 1, wherein the synchronizing includes (i) an initial copy operation to copy existing data from the source volume to the destination volume, and (ii) establishing a mirror to maintain ongoing replication to the destination volume until the migration is complete.

6. The method of claim 1, wherein the host connects to the source appliance and destination appliance using an NVMe-based access protocol.

7. The method of claim 6, wherein the source appliance and destination appliance employ an iSCSI-based inter-appliance connection to effect the synchronizing, outside of the normal IO path.

8. The method of claim 1, wherein the primary volume is a volume having an NVMe namespace identifier NSID and a namespace global unique identifier NGUID previously provisioned on the source appliance, and wherein the source volume and destination volume are logical entities representing the primary volume during the migration, such that the primary volume is accessed as the source volume at the source appliance prior to the migration, and the primary volume is accessed as the destination volume at the destination appliance after the migration.

9. The method of claim 3, wherein normal, non-failure cutover operation includes, after the fallback states are set to inaccessible at the source appliance and accessible at the destination appliance, switching the access states of the ANA group at the source and destination appliances to their respective fallback states, thereby exposing the destination volume to the host computer as accessible at the destination appliance and inaccessible at the source appliance.

10. A data storage federation including a source appliance and a destination appliance, the appliances being co-configured and co-operable to non-disruptively migrate a primary volume as a source volume from the source appliance to the destination appliance by:

provisioning the source volume and mapping the source volume to a host computer, the source volume being associated with a namespace being a quantity of non-volatile storage formatted into logical blocks, the mapping including assigning the source volume and the namespace to an asymmetric namespace access (ANA) group, the ANA group initially exposing the source volume and the namespace to the host computer as accessible at the source appliance;

based on the provisioning and mapping making the source volume accessible to the host computer, performing storage read and write operations of the host computer to the source volume at the source appliance; and subsequently migrating the source volume to the destination appliance by:

(1) creating a destination volume on the destination appliance and expanding the ANA group to include the destination volume, the destination volume being associated with the namespace, the ANA group initially exposing the destination volume and the namespace as inaccessible to the host computer at the destination appliance; and (2) subsequently synchronizing the destination volume to the source volume and then performing a cutover including (i) copying volume metadata including host reservations from the source volume to the destination volume, and (ii) changing the ANA group to expose the source volume and the namespace as inaccessible at the source appliance and the destination volume and the namespace as accessible at the destination appliance.

11. The data storage federation of claim 10, wherein the migration further includes, prior to the cutover, changing the ANA group to expose a Change access state for both the source volume at the source appliance and the destination volume at the destination appliance, the Change state signifying a temporary inaccessibility to the host that effectively suspends host IO to the primary volume during the cutover.

12. The data storage federation of claim 11, wherein the migration further includes, in connection with the use of the Change access state, the use of corresponding internal fallback states for handling failures during the migration, the fallback states being initially set to accessible at the source appliance and inaccessible at the destination appliance, and then during the cutover being set to inaccessible at the source appliance and accessible at the destination appliance, thus ensuring that future access to the primary volume is at the destination appliance and not the source appliance.

13. The data storage federation of claim 10, wherein changing the ANA group to expose the destination volume as accessible at the destination appliance includes use of an Optimized path state and a Non-optimized path state, the Optimized path state identifying a default access path for normal operation, the Non-optimized state identifying a secondary path usable for exceptional conditions.

14. The data storage federation of claim 10, wherein the synchronizing includes (i) an initial copy operation to copy existing data from the source volume to the destination volume, and (ii) establishing a mirror to maintain ongoing replication to the destination volume until the migration is complete.

15. The data storage federation of claim 10, wherein the host connects to the source appliance and destination appliance using an NVMe-based access protocol.

16. The data storage federation of claim 15, wherein the source appliance and destination appliance employ an iSCSI-based inter-appliance connection to effect the synchronizing, outside of the normal IO path.

17. The data storage federation of claim 10, wherein the primary volume is a volume having an NVMe namespace identifier NSID and a namespace global unique identifier NGUID previously provisioned on the source appliance, and wherein the source volume and destination volume are logical entities representing the primary volume during the migration, such that the primary volume is accessed as the source volume at the source appliance prior to the migration, and the primary volume is accessed as the destination volume at the destination appliance after the migration.

* * * * *